(12) United States Patent
Wong et al.

(10) Patent No.: US 7,117,486 B2
(45) Date of Patent: Oct. 3, 2006

(54) SYSTEM AND METHOD FOR MIGRATION OF SOFTWARE

(75) Inventors: Wai Ming Wong, Toronto (CA); Sandeep Kamat, North York (CA)

(73) Assignee: Sun Microsystems, Inc., Santa Clara, CA (US)

( * ) Notice: Subject to any disclaimer, the term of this patent is extended or adjusted under 35 U.S.C. 154(b) by 454 days.

(21) Appl. No.: 10/422,904

(22) Filed: Apr. 25, 2003

(65) Prior Publication Data

US 2004/0068715 A1 Apr. 8, 2004

(51) Int. Cl.
G06F 9/45 (2006.01)

(52) U.S. Cl. ...................................... 717/141

(58) Field of Classification Search ................ 717/137, 717/141
See application file for complete search history.

(56) References Cited

U.S. PATENT DOCUMENTS

| | | | | |
|---|---|---|---|---|
| 6,334,215 B1 * | 12/2001 | Barker et al. | ............... | 717/167 |
| 6,698,017 B1 * | 2/2004 | Adamovits et al. | .......... | 717/168 |
| 6,889,376 B1 * | 5/2005 | Barritz et al. | ................ | 717/175 |
| 2003/0074386 A1 * | 4/2003 | Schmidt et al. | ................. | 709/1 |
| 2003/0188036 A1 * | 10/2003 | Chen et al. | .................. | 709/310 |

FOREIGN PATENT DOCUMENTS

CA 2284949 10/1999

* cited by examiner

Primary Examiner—John Chavis
(74) Attorney, Agent, or Firm—Michael C. Martensen; William J. Kubida; Hogan & Hartson LLP

(57) ABSTRACT

The present invention provides an integrated migration environment which assists in migration of software systems. The invention further provides an object oriented framework through which the tool can be extended to handle additional languages and platforms. A system and method is provided for the identification of migration issues and subsequent modification of the software system. The system and method can be deployed over the web for quick installation and is executable on multiple platforms. The invention provides a means to migrate software systems from any source platform to any target platform.

16 Claims, 9 Drawing Sheets

SYSTEM AND METHOD FOR MIGRATION OF SOFTWARE

PRIORITY CLAIM

The present application claims priority from the Canadian Patent Application entitled System and Method for Migration of Software filed with the Canadian Intellectual Property Office on Oct. 4, 2002, and bearing application number 2,406,866, the contents of which are incorporated herein by reference.

FIELD OF THE INVENTION

The present invention relates generally to software maintenance and more particularly to migration of software from one platform to another.

BACKGROUND OF THE INVENTION

Software programs are written for many different operating systems and hardware platforms. Often, there is a need to make a software program written on one platform ("source platform") run on a different platform ("target platform"). The software program written for the source platform might not work on the target platform as there can be difference between the two platforms. These differences can be due to a variety of factors, such as hardware architecture differences, operating environment differences, etc. Also, as software products undergo continuous development, application programs written for older version can become incompatible with newer versions. The process of achieving a transfer from the source platform to the target platform is referred to herein as "migration".

One particular known environment where migration can be desired, and where migration can encounter the foregoing problems, is where the target platform has a Solaris Operating Environment. For example, the source platform might be an earlier version of Solaris, or one of the Unix variants (HP-UX, AIX etc.) or completely separate platform, such as Windows NT. Most often, during the migration process, the programming language remains the same, but code that compiled flawlessly on the source platform has errors or incompatibilities when that same code is compiled on the target platform. Any incompatibilities between the source and target platform are referred to herein as "issues". The issues can include, for example, hardware dependencies, operating system application program interface ("API") call incompatibilities or build environment incompatibilities. The existing, manual migration process involves detecting these issues between the source and target platform and then resolving them in order to make the software system work on Solaris Operating Environment.

As will now be understood by those of skill in the art, the migration process has a number of challenges to solve. Software systems to be migrated can range from a few thousand lines of code to several million lines of code. Yet the current, manual migration process requires quick identification of migration issues without extensive knowledge of the overall software system. Furthermore, it is usually desired to carry out the migration process in short period of time—especially when compared to accepted time frames for program maintenance. Software maintenance is continuous effort while migration is a one-time effort, usually performed under time constraints. Furthermore, the process of manual migration can be hampered because the software to be migrated may be old and include minimal or no documentation. In general, migration is carried out by people who are unlikely to be the original creator or maintainer of the software, therefore adding time and complexity to the process of manual migration. Manual migration of software typically requires the professional conducting the manual migration to have knowledge of both the source and target platform and, in addition, to know all the issues that exist between the two platforms. Such resources are expensive and not readily available.

Another problem with manual migration is knowing whether the software program to be migrated from the source platform is actually complete—i.e. whether the entire software program has been provided to the person conducting the migration—thus requiring the person conducting the migration to detect missing pieces of the system. Doing this task manually can be error prone and costly.

Yet another problem with manual migration is the lack of a database of issues that are known to exist between the source and target platforms. Such a database has to be built over a period of time by capturing the issues encountered through various migration projects, but which are typically only compiled in a manual fashion.

Attempts have been made to use existing maintenance and reverse engineering tools to automate the migration of software between platforms, but generally these tools provide unsatisfactory and/or somewhat deficient results. In general, such prior art tools are not geared specifically to the problem of migration of software, but rather towards the more general area of software maintenance and reverse engineering. Further, these tools do not include databases of known issues, or the means to gradually build such databases. Further, such prior art tools generally lack built-in means to detect migration issues, and there is generally no overall framework for easily plugging in different parsers and analyzers to use with different source languages Certain other prior art tools are targeted towards the more specific problem of migration from a specific source platform to specific target platform, but lack general flexibility to migrate between a plurality of different source platforms and/or a plurality of different target platforms. In general, prior art tools are geared towards reverse engineering or program maintenance. One of the aims of such tools is building high level models for the software systems in order to assist in program understanding and are generally built for continuous maintenance. Prior art tools are generally not geared towards migration of software within a short time frame. Many prior art tools run on only a specific platform and require significant initial setup time. Still other prior art tools lack robust parsers capable of parsing incomplete source code from the source platform, and provide poor or no facilities to record the differences detected during a migration process in order to assist in future migration.

SUMMARY OF THE INVENTION

In an aspect of the present invention there is provided a process for migration of software from a source platform to a target platform which comprises of the following steps:
   scanning the software code and building a repository of the software code;
   classifying the software code in accordance with known file types;
   parsing the software code;
   generating a repository of program entities;
   loading a list of potential issues from a database of known issues;

detecting the occurrences of issues in the software code; and, generating a report including at least a list of the detected issues.

In a particular implementation of the foregoing aspect, there is provided the additional step of correcting the detected issues.

The correcting step can be performed in any desired manner, such as manually coding corrections, or using an automatic code generator to replace sections of code in the software code for the intended target platform to overcome the detected issues.

The generated report can optionally include specific recommendations as to how to resolve the detected issues and/or estimates of the amount of effort that will be required for manually correcting the identified issues.

In a particular implementation of the foregoing aspect, there is provided the additional step of optionally detecting missing files and generating a report of those missing files.

BRIEF DESCRIPTION OF THE DRAWINGS

The present invention will now be explained, by way of example only, with reference to certain embodiments and the attached Figures in which.

DESCRIPTION OF THE INVENTION

Figure 1:
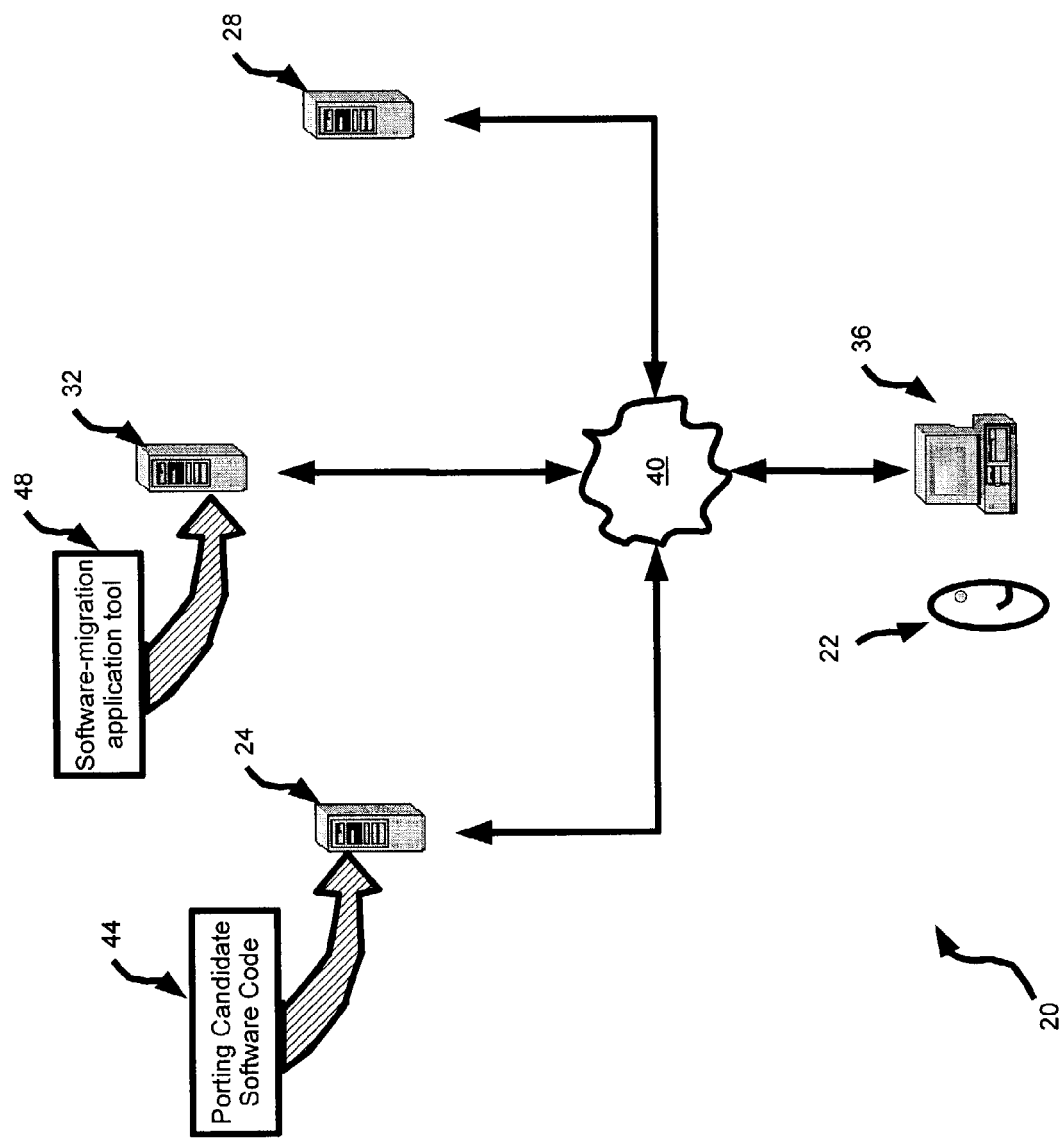
FIG. 1 is a schematic representation of a system for migrating software in accordance with an embodiment of the invention.

Referring now to FIG. 1, a system for migration of software code from a source platform to a target platform is indicated generally at 20. As used herein, the term "platform" denotes any one or more specific combinations of components that define a specific computing environment. Such components include particular computing hardware (i.e. CPU, motherboard, memory, network interfaces, hard disc storage, etc) and/or operating systems and/or compilers and/or other hardware components and/or other software components.

In the present embodiment, system 20 is comprised of a source platform 24, a target platform 28, a host server 32 and a client machine 36, all of which are interconnected by a network 40. Source platform 24 can be any type of platform, such as any type of server hardware produced by Hewlett Packard, IBM, or the like, that is operable to execute a particular operating system, such as Unix, Linux or Windows, and a compiler, such as a C++ compiler.

Target platform 28 can be any type of platform different from source platform 24. The difference between target platform 28 and the source platform 24 can be any difference in any one or more of the components, that define target platform 28.

In the present exemplary embodiment, source platform 24 is a RP7400 by Hewlett Packard which, is operable to execute a suitable OS, such as HP UX 10.20, and to store software code 44 that is written in C++ and which can be compiled and executed on platform 24 using a C++ compiler specific to platform 24. In the present exemplary embodiment, target platform 28 is a Sun Enterprise 250 Server, manufactured and sold by Sun Microsystems of Santa Clara, Calif. and produced by Sun Microsystems. Target platform 28 is also operable to execute a C++ compiler that is specific to platform 28. In the present exemplary embodiment, when software code 44 is in its original form and compiled using the compiler resident on platform 28, a plurality of errors occur. However, as will be explained in greater detail below, at least a portion of these errors can be identified and/or addressed using the embodiments taught herein, thereby assisting and/or automating the migration of software code 44 onto target platform 28.

System 20 further includes a host server 32, which can be any known type of server such as a Sun Enterprise 250 Server, sold by Sun Microsystems of Santa Clara, Calif. or any other computer system of substantially equivalent functionality. In a present embodiment, host server 32 is operable to store and deploy a software migration application tool 48 that can be used to migrate software code 44 from platform 24 to platform 28, the details of which will be explained in greater detail below.

System 20 further includes a client 36, through which a user 22 can interact with system 20 in order to conduct the migration of software code 44 onto target platform 28 using tool 48.

In the present embodiment, the components of system 20 are thus all interconnected by a network 40. The type of network 40 (or other means of interconnection) is not particularly limited, and can be a wide-area-network, local-area-network, the Internet or combinations thereof such that a means of electronic communication is provided between source platform 24, target platform 28, server 32 and client 36. Further, the protocols used to operate network 40 are not particularly limited, but in the present embodiment is the TCP/IP protocol. Further, while the present embodiment shows a physical interconnection of source platform 24, target platform 28, server 32 and client 36, it is to be understood that in other embodiments no such physical connection is required, as the process of moving of software code and software applications can be effected through the use of removable storage media such as floppy discs, tapes or rewritable compact discs or the like.

Figure 2:
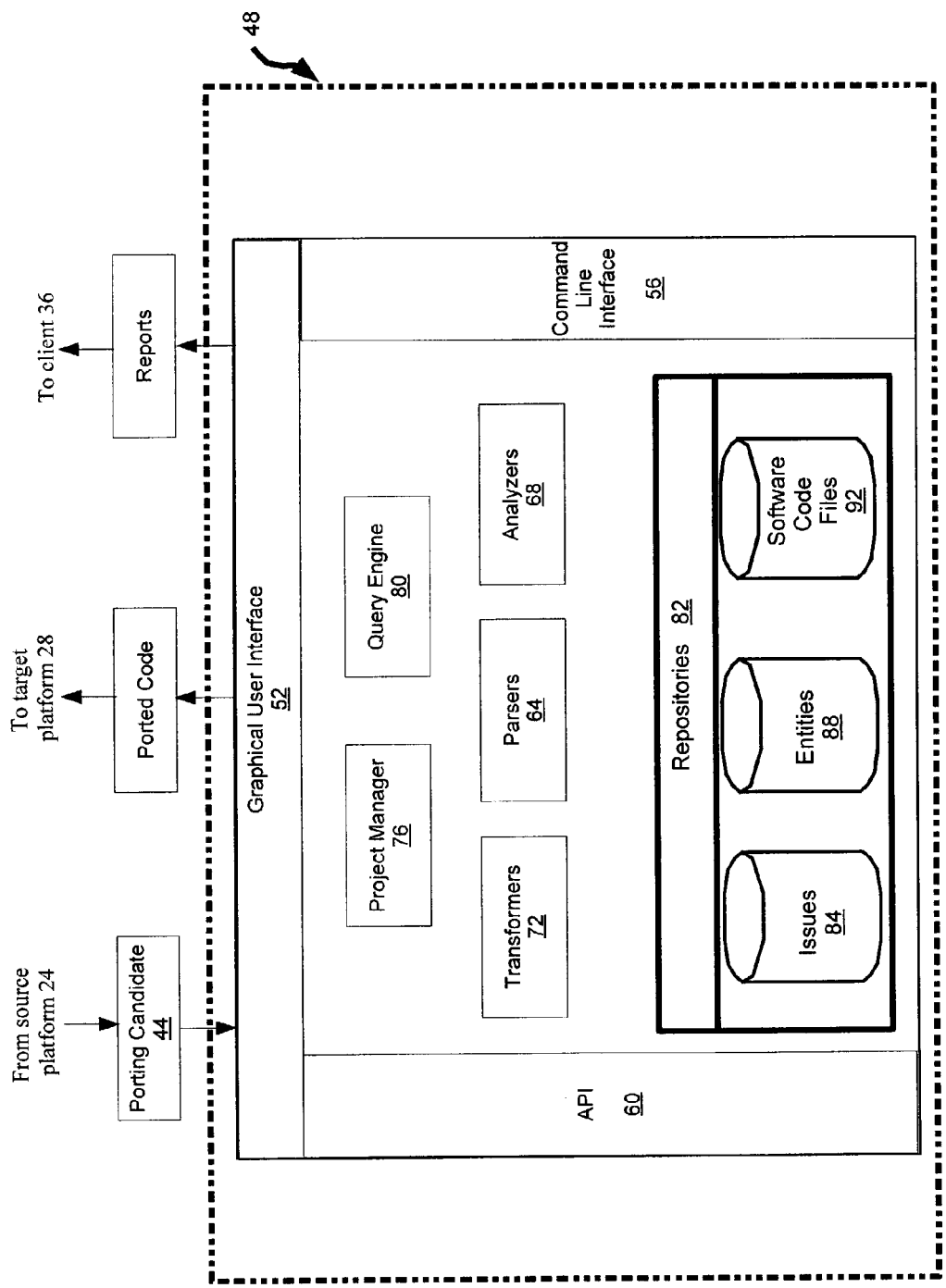
FIG. 2 is a schematic representation of a software migration application usable with the system shown in FIG. 1 for use in software migration.

FIG. 2 shows a schematic representation of software migration application tool 48 that is deployable from server 32. In the present embodiment, tool 48 is implemented in Java and accessible over the network 40 using the Java Web Start mechanism, thereby allowing tool 48 to be run on multiple platforms. In the present embodiment, a language such as Java, or a functionally equivalent language, is used to implement software migration application tool 48. In other embodiments, other languages other than Java can be used.

Tool 48 is comprised of a graphical user interface 52, a command line interface 56 and an application program interface ("API") 60 through which access to tool 48 can be effected via user 22 at client 36. Core functionality within tool 48 is provided with one or more parsers 64, one or more analyzers 68 and one or more transformers 72. Typically, one parser 64 is provided for each possible path of migration from a given source platform 24 to a given target platform 28. Such functionality is supported by a project manager 76 and a query engine 80. These functional elements of tool 48 utilize an issue repository 84, an entity repository 88 and a porting candidate software code repository 92.

In order to increase the overall speed of operation of tool 48, repositories 84, 88 and 92, are realized as a local persistence store. The repositories 84 and 88 are designed to operate at high speeds and to efficiently manage persistence storage, and are capable of storing large amount of software entities. As used herein, the term "persistence store" means a lightweight object oriented persistence store which is capable of managing objects. Tool 48 also provides for plug-in interfaces via API 60 through which a different persistence store, such as an relational database persistence store, can be plugged in. Switching between different persistence stores can thus be done easily by changing the configuration information without a need to recompile tool 48.

When operated by user 22, tool 48 is thus operable to receive porting candidate software code 44 from source platform 24, and to store that code 44 in software code repository 92 for processing.

Once code 44 is stored in repository 92, parser 64 can then build a software entity repository for storage in repository 88 from code 44. Parser 64 (which can include a plurality of different parsers depending on the source platform 24 and/or candidate code 44 being migrated) is configured to be robust. The term "robust" means that parser 64 is configured to tolerate unfamiliar patterns or other code structures, without crashing tool 48, and while still providing meaningful output. One particular programming specification to which parser 64 can be configured in order to provide robustness is to configure parser 64 to isolate unfamiliar portions of code 44 for later manual analysis, while continuing to parse those sections of code 44 that are familiar. While not required, it is presently preferred that parser 64 be designed as a "plug-in" to tool 48, so that different parsers can be plugged-in to tool 48 depending on the language type of the software code 44 and/or the particular source platform 24 on which code 44 is resident. In the present embodiment, further robustness of parser 64 is achieved by constructing parser 64 to be capable of parsing incomplete software code 44.

Parser 64 is operable to generate program entities about code 44 which are saved into entity repository 88. The types of entities detected by parser 64 are customizable, to allow the storage of as much information as is needed about code 44 into entity repository 88. Parser 64 is also operable to generate global cross referencing information for code 44 and store that information in entity repository 88.

Figure 3:
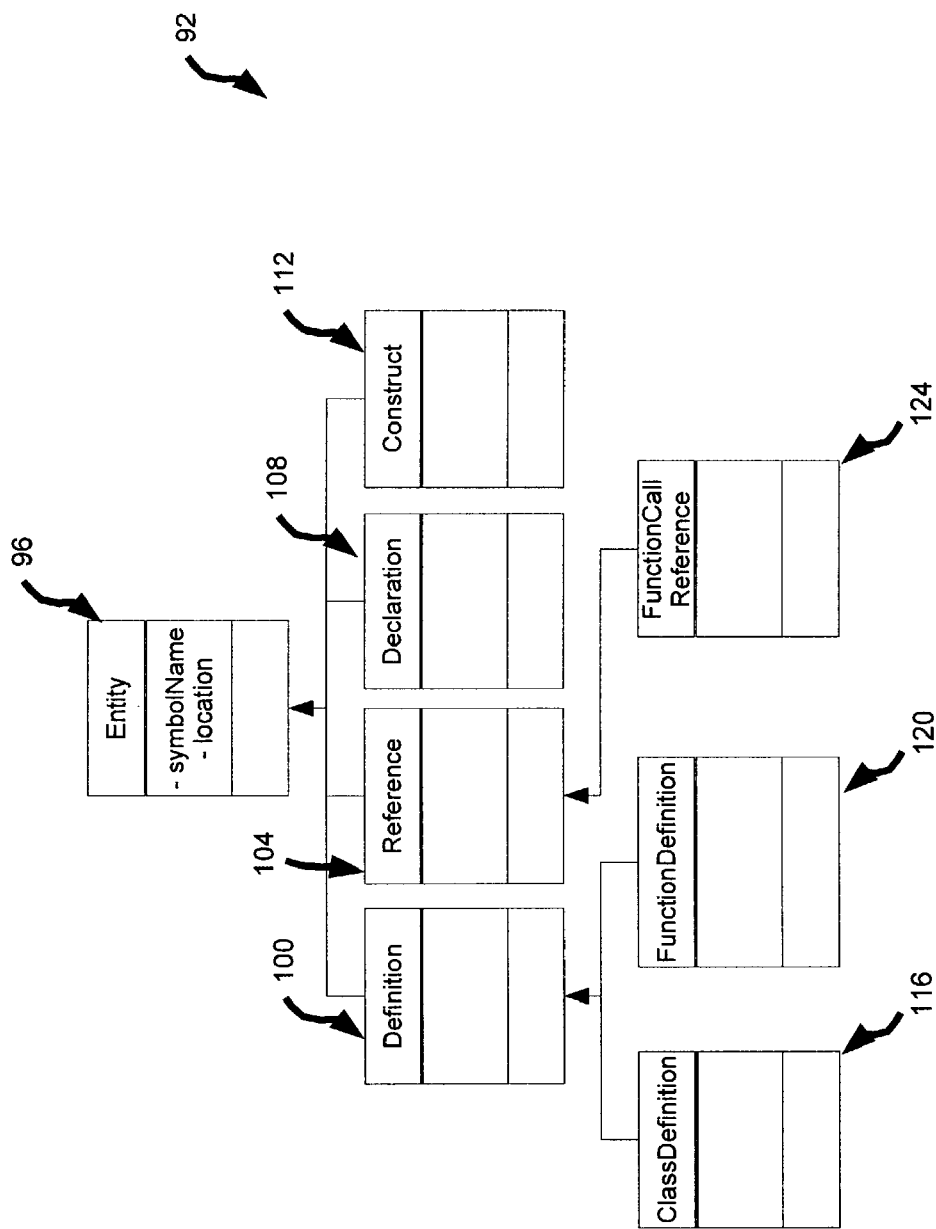
FIG. 3 is an entity class hierarchy diagram representing an exemplary list of certain types of entities generated and stored in the entity repository shown in FIG. 2.

Referring now to FIG. 3, an exemplary generic program entity class hierarchy diagram is indicated generally at 92. Diagram 92, represented in the Universal Mark-up Language ("UML") format, depicts an example taxonomy of program entities that may be used as a template when building entity repository 88. Diagram 92 depicts a number of "is-a" relationships between the program entity types. In this example, a program entity of the type ClassDefinition 116 is also of the type Definition 100. In other words, a "ClassDefinition" program entity is a "Definition", but a "Class Definition" is not a "Reference" but is still considered as an "Entity". Thus, any program entity type shown in the diagram is classified generically as "Entity" 96. Each entity type, represented as a rectangle in FIG. 3, can have certain attributes, for example, a name. With the concepts of entity type classification and attributes, repository 88 and query engine 80 can be configured to support queries based on known types classifications and attributes. The query capabilities of tool 48 are further enhanced by the ability to specify the set of source files in code 44 to apply a given query. The source file set can be specified by, for example, a set of 0 to N string patterns in the file names and/or a set of 0 to M known file types. An example of such a query is to retrieve all program entities of the type "ClassDefinition" with an entity name beginning with the string "Abc" in all C++ source files in code 44. In certain cases, a user can retrieve all program entities of the type "Entity" 96 in all files of code 44, however such a query will take longer than a query that is more refined. It is to be understood that new entity sub-types and attributes can be defined with minimal changes to tool 48, parser 64 and repository 88.

In addition to the pre-defined relationships depicted in FIG. 3, tool 48 is also operable to represent arbitrary general relationships between entities (ie. where a relationship is a programming language specific association between two or more entities).

(While not included in the present embodiment, it is to be understood that in other embodiments of the invention, a taxonomy of relationships between the entities in code 44 can also be created and utilized to build further information when building entity repository 88. By building information that specifies the specific relationships between such entities, further reports and/or automation of migration can be effected, as such relationship can be mapped to further known software migration issues that may arise in the context of how particular entities are actually related. Thus, in certain situations where no known issue is associated with a particular set of entities, but where a known issue is associated with a particular relationship between those entities, then such a repository of information about those relationships can be utilized to resolve migration issues that are specific to such relationship issues.)

Referring again to FIG. 2, analyzer 68 is operable to detect issues in the parsed code 44 (as it is stored in entity repository 88) and to generate a report of those detected issues. Thus, in order to provide analyzer 68 the means to perform such detection, a known set of issues for the given source platform are saved in issue repository 84. Issue repository 84 represents a generic abstraction of migration issues known to exist when migrating between source platform 24 and target platform 28, and typically includes recommendations for amendments and/or changes, comments and/or examples, all or any of which can be used for resolving the issues to code 44 in order to achieve a successful migration of code 44 onto target platform 28. In a present embodiment, issue repository 84 is a "living" repository, in that newly discovered issues are typically added to issue repository 84 using any desired means, such as by periodically updating the files in issue repository manager 84 with any updated issues. The means for updating manager 84 are not particularly limited, and can include a tool separate from tool 48 whose functionality is directed to identification and tracking of issues, and for building updates for the issue repository manager 84. As a living repository, issues in repository 84 are also reusable for other migration projects involving different code than code 44. As will be explained in greater detail below, entities of code 44 can be compared against the issues in repository 84 to detect issue occurrences in code 44. The results of such comparisons can be used to create an issue occurrence report on the detected issues, and/or to suggest manual amendments (to user 22), or recommend automated amendments (to transformer 72) that can be effected on code 44 to migrate code 44 onto target platform 28.

In the present embodiment, issue repository 84 also includes a weighting information about each issue, whereby each is assigned a weight which reflects the difficulty in resolving that issue, expressed as, for example, a number of hours need to manually effect modifications to the code 44 when addressing that specific issue during migration. A weighting factor table representing a factor depending on the number of occurrences is also used to provide further estimates regarding the difficulty of resolving the issue. Using the list of issue occurrences, the issue weight and the weighting factor, a total estimate of hours for effecting the migration can be generated. The weight assigned to an issue can be changed as more migrations are effected between a particular combination of source platform 24 and target platform 28. The weight can also be modified as the level of confidence increases in automatically correcting the issue using software code 44 transformation. (Alternatively, such automatic modification can be effected based on a per-issue basis rather than a given weighting basis—i.e., whether a particular known issue has an automatic correction available, or not. Thus, where a particular issue has a means for automatic modification, the associated weight can be lowered.)

To assist in the explanation of the foregoing, Table I shows an exemplary list of issues and associated weights. Table II shows an exemplary list of hours of manual labour needed to correct a given issue of a given weighting, and Table III shows an exemplary list of weighting factor table used to modify the hour estimate in Table II according to the frequency of occurrence of a given issue.

TABLE I

List of Exemplary Issues and Associated Weighting

| Issue # | Issue Description | Weight |
| --- | --- | --- |
| 1 | Syntax variation in "GetTime" function. Source uses GetTime(Now); Target uses GetDateTime(Now) | 1 |
| 2 | No known equivalent Class in Target Platform; Source includes "Mcheck" Class; Target has no equivalent Class. | 100 |
| 3 | Memory address variation in hardware of source platform and target platform; Memory allocation command in Source Hardware addresses a Read Only Memory location in Target Hardware | 40 |

TABLE II

Effort Needed to Correct an Issue of a Given Weight

| Weight Range | Estimate of Manual Hours to Modify software | Automatic Modfication Available? |
| --- | --- | --- |
| 1 | 1 | Y |
| 2–79 | 3 | N |
| 80–100 | 12 | N |

TABLE III

Weighting Factor Table

| Occurrences of an Issue | Weighting Factor |
| --- | --- |
| 1–19 | 1 |
| 20–50 | 1.5 |
| 50+ | 3 |

Thus, for example, where Issue "2" arises then this issue is given a weight of "100" (derived from Table I), which means that to address issue "2" then "12" hours will be needed for manual software migration (derived from Table II). However, where Issue "2" occurs 20 times, then a weighting factor of "1.5" (derived from Table III) will be applied to the hours estimated to address Issue "2" during software migration. Thus, then the number of hours to manually modify the software address Issue "2" during migration will be calculated according to the following formula: Hours=12×1.5=18 hours.

It will thus now be understood that other or additional means of providing estimates for addressing issues during migration can be implemented as desired.

By way of further explanation of Table II, it will also be noted that a third column is provided that indicates whether automatic modification using transformer 72 is available to resolve a given issue. As shown in Table II, where an issue has a weighting of "1", then transformer 72 can be used to effect automatic modification rather than relying on manual modification. Such automatic modification will typically be based on whether a software routine is available to make specific modifications to code 44 so that those issues of weight "1" are automatically modified in code 44. For example, where such a modification simply requires a "search and replace" of certain syntax (as for example, shown with regard to Issue "1" in Table 1), then the automatic resolution of this issue can be readily effected by having transformer 72 invoke a predefined macro command that searches for the offensive term in code 44 and replaces with the appropriate corrected term in code 44. Thus, where this issue is Issue 1 from Table 1, the search string will look for "GetTime(Now)", to be replaced with the string "GetDateTime(Now)". More complex routines to effect more complex modifications according to more complex issues can be created, as desired.

Where automatic modifications are not effected, the modifications can be made manually using tool 48 to identify such issues and highlight such issues in code 44 so user 22 can effect the needed manual modifications to achieve migration. One way to implement this is, after the analysis has been performed by analyzer 68, the source files from software code 44 can be presented on an external editor such as xemacs, vim or the like, which is invoked by tool 48 and/or "pluggable" into tool 48. Tool 48 can thereby cooperate with the external editor to highlight the identified sections of code 44 where a particular issue or issues are occurring, so that those sections of code 44 can be edited. The corresponding issue comments, corrective recommendations and examples can be optionally displayed in a window opened by tool 48 that lies beside the external editor which displays the particular portion of code 44 that is being highlighted. User 22 is also able to thus browse through the code according to the issue, having the corresponding information about each issue displayed next to the relevant section of code as each issue in code 44 is browsed.

In general, rather than using the reports generated by analyzer 68 to manually effect migration corrections, it is contemplated that, alternatively or in addition to manual migration correction, at least some of the issues can be corrected automatically using the transformer 72. Such transformations can be applied in the batch mode or interactively under user control.

Tool 48 also includes a query engine 80, which houses a high level query language that is directed towards assisting in migrating code 44. The query language can be used to query source file repository 92, the issue repository 84, the entity repository 88 and/or the issue occurrences. (Where the entity repository 88 includes relationship information between entities, then such queries can be directed to deriving information about those relationship and/or any issues associated therewith.) Using the query language, it is possible to obtain the cross referencing information from the entity repository, to further assist in the manual correction of issues, and/or to further derive information that can be used to enrich issue repository 84, and/or to assist in the creation or modification of known transformations that can be used by transformer 72 to effect migration through automatic issue corrections.

Figure 4:
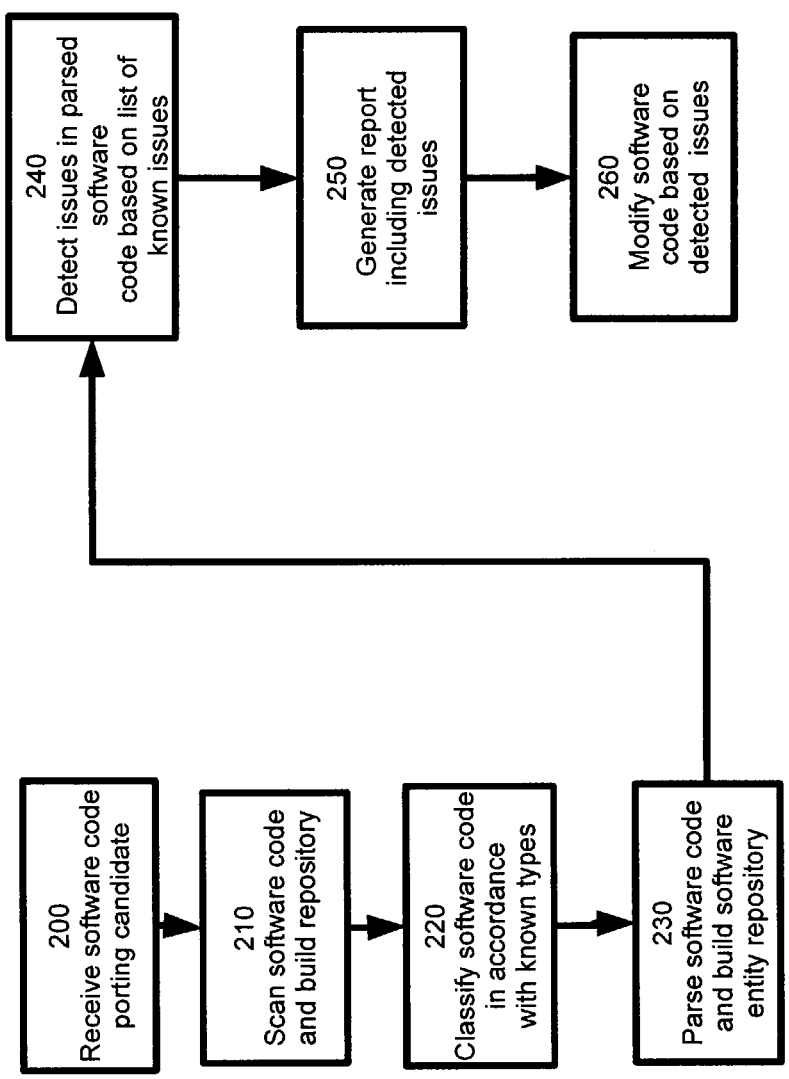
FIG. 4 is a flow-chart showing a method of migration of software which can be implemented on the system of FIG. 1, or the like, in accordance with another embodiment of the invention.

FIG. 4 shows a method of operating system 20, including a set of steps that can be used to migrate software code 44 from source platform 24 to target platform 28. It is contemplated that the following discussion will assist in the foregoing understanding of tool 48 and system 20, and that the foregoing discussion will assist in the following discussion of the method in FIG. 4. However, those of skill in the art will recognize that the operation and sequence of steps of the method can be varied, and need not actually be implemented on a system identical to system 20, and such variations are within the scope of the invention.

Beginning first at step 200, the porting code candidate is received via some means external to tool 48. The received code 44 is accessible to tool 48 on client 36. When implemented on system 20, user 22 at client 36 initiates the migration tool 48 and any project creation and initialization steps are effected by project manager 76. When using tool 48 to implement step 200, it can be desired to implement project manager 76 such that project manager 76 will also initially receive information identifying the specifications of source platform 24 and the specifications of target platform 28 so that a relevant set of issues associated with such migrations can be pre-identified in issue repository 84, and so that an appropriate entity class hierarchy (such as hierarchy 92 or the like) can be identified that corresponds with the relevant set of issues, thereby increasing the speed with which the remaining steps in the method can be effected.

Next, at step 210, the code is scanned in order to build a repository thereof. When step 210 is implemented on system 20, project manager 76 scans code 44 and builds a repository of that code 44 in repository 92, for later processing by tool 48.

Figure 5:
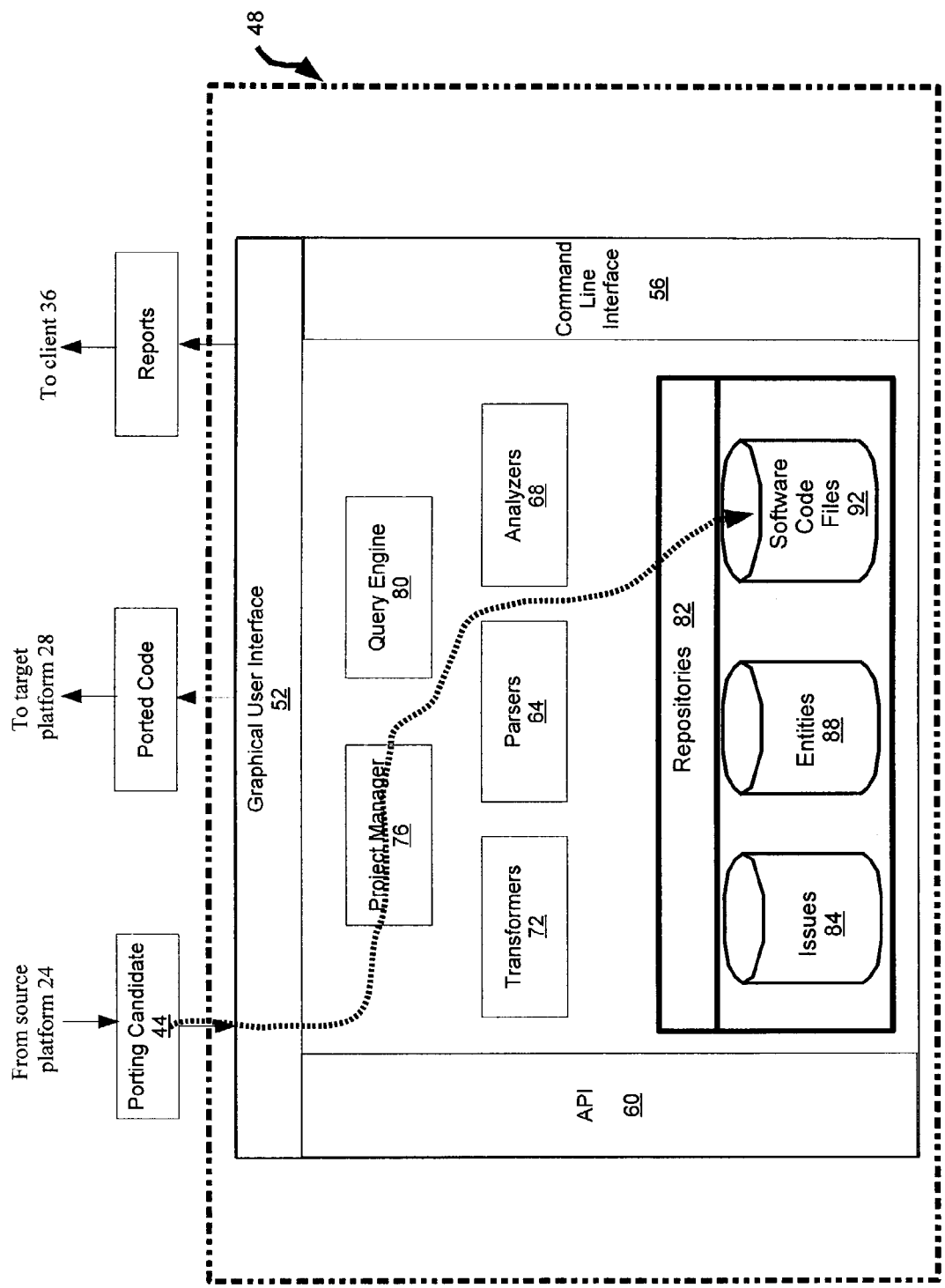
FIG. 5 is a representation of the flow of data in steps 200 and 210 of FIG. 4.

A representation of the flow of data in steps 200 and 210 through tool 48 is shown in FIG. 5, with a dotted line showing the path of code 44 being received and scanned by project manager 76.

The method then advances to step 220, at which point project manager 76 classifies code 44 as it is stored in repository 92 in accordance with known file types. For example, in Table IV a plurality of exemplary names and associated patterns of a plurality of file types are shown. The associated patterns can be used to classify code 44.

TABLE IV

| Name | Pattern |
|---|---|
| c++ | *.CXX,*.CC,*.cc,*.cpp,*.C,*.cxx,*.CPP |
| make | *.mak,*/[mM]akefile,*.MAK,*.m.k,*.MK,*/MAKEFILE |
| h | *.ci,*.hxx,*.h,*.hh,*.HXX,*.hpp,*.H,*.HPP,*.HH |
| c | *.c,*.ec,*.pc |
| text | *.txt,*.TXT |
| asm | *.asm,*.ASM,*.s,*.ec |
| fortranh | *.inc |
| fortrani | *.f77,*.f90,*.f |
| html | *.HTML,*.html,*.HTM,*.htm |
| idl | *.idl,*.IDL |
| java | *.java,*.JAVA |
| lex | *.l |
| make_support | *.INCL,*.incl |
| prj | *.prj,*.PRJ |
| python | *.PY,*.py |
| sh | *.sh,*.csh,*.ksh |
| yacc | *.y |
| asp | *.ASP,*.asp |
| jsp | *.JSP,*.jsp |
| perl | *.pl,*.PM,*.pm,*.PL |
| tcl | *.tcl,*.TCL |
| static_lib | *.a |
| dyn_lib | *.so,*.DLL,*.dll |
| ps | *.ai,*.eps,*.PS,*.EPS,*.ps |
| pdf | *.PDF,*.pdf |
| obj | *.O,*.o |

Figure 6:
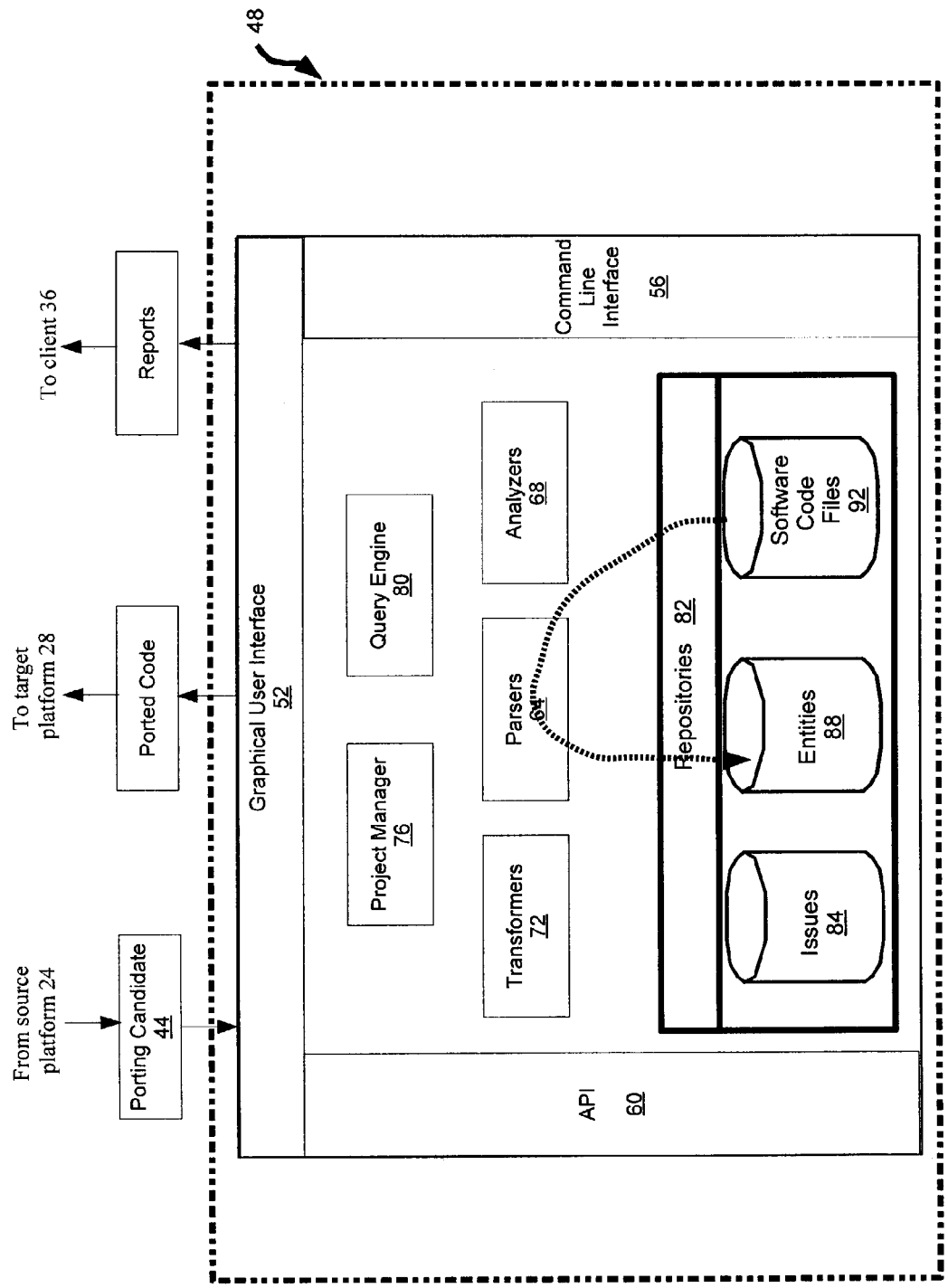
FIG. 6 is a representation of the flow of data in step 230 of FIG. 4.

The method then advances to step 230, at which point parser 64 accesses the code 44 as it is stored in repository 92 and builds a software entity repository for storage in entity repository 88. Typically, a set of known issues associated with the specific migration of a given source platform 24 to a given target platform 28 is preloaded 5 or otherwise available during the execution of step 230, to thereby provide a reference to be used during the parsing and building of entity repository 88. Also typically, entity repository 88 is built according to the format of a predefined entity class hierarchy, such as hierarchy 92 or the like, that corresponds to the set of known issues. A representation of the flow of data in step 230 is shown in FIG. 6, with a dotted line showing the path of code passing through parser 64 and into entity repository 88.

Figure 7:
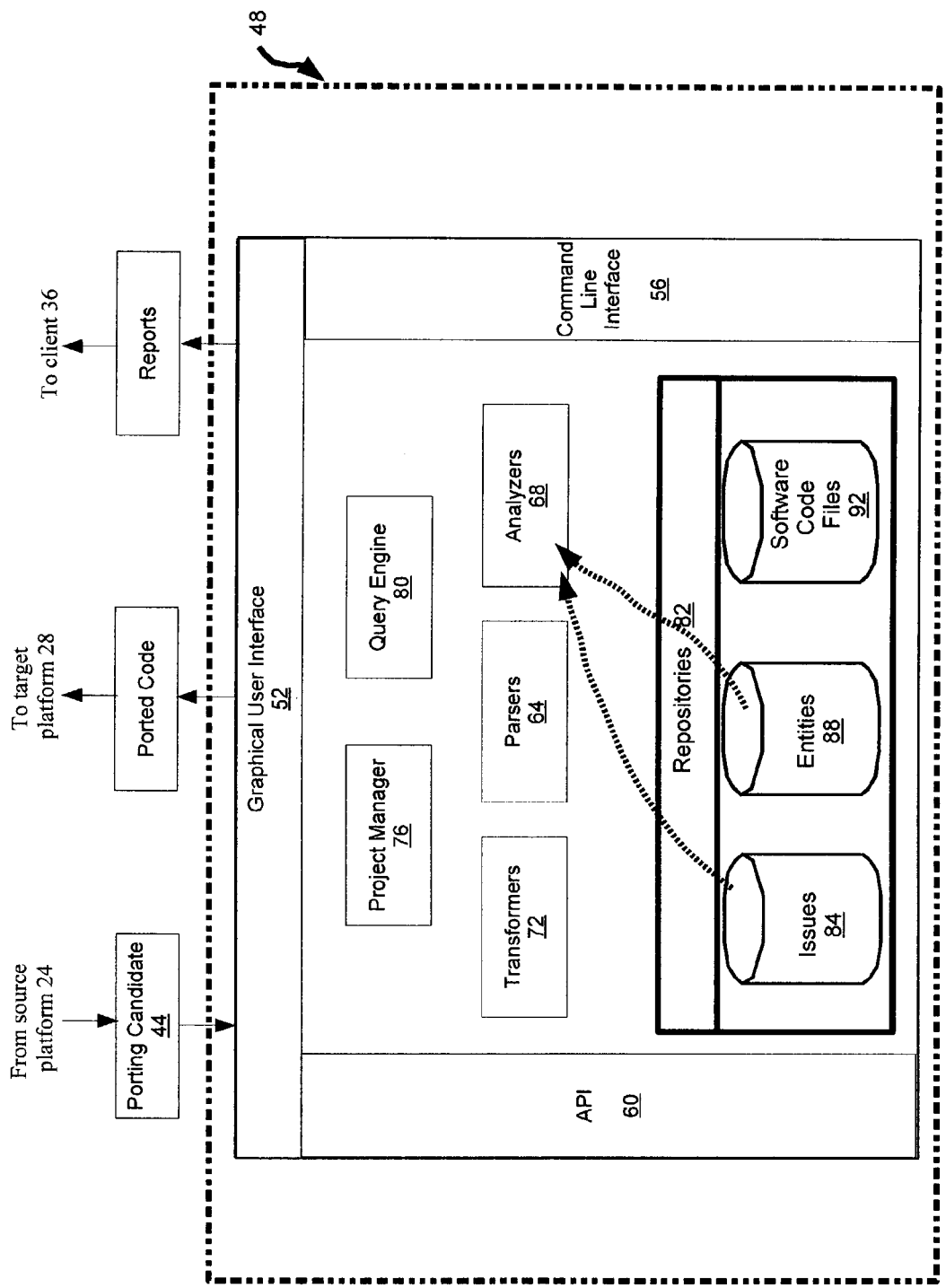
FIG. 7 is a representation of the flow of data in step 250 of FIG. 4.

Having developed entity repository 88, the method then advances to step 240 at which point issues are detected in code 44, by analyzing code 44 as it is stored and classified in entity repository 88. Such issues are detected by analyzer 68 which compares data stored in entity repository 88 with the set of known issues that are available in issue repository 84. A representation of the flow of data in step 240 is shown in FIG. 7, with a dotted line showing analyzer 68 accessing issue repository 84 and entity repository 88.

Figure 8:
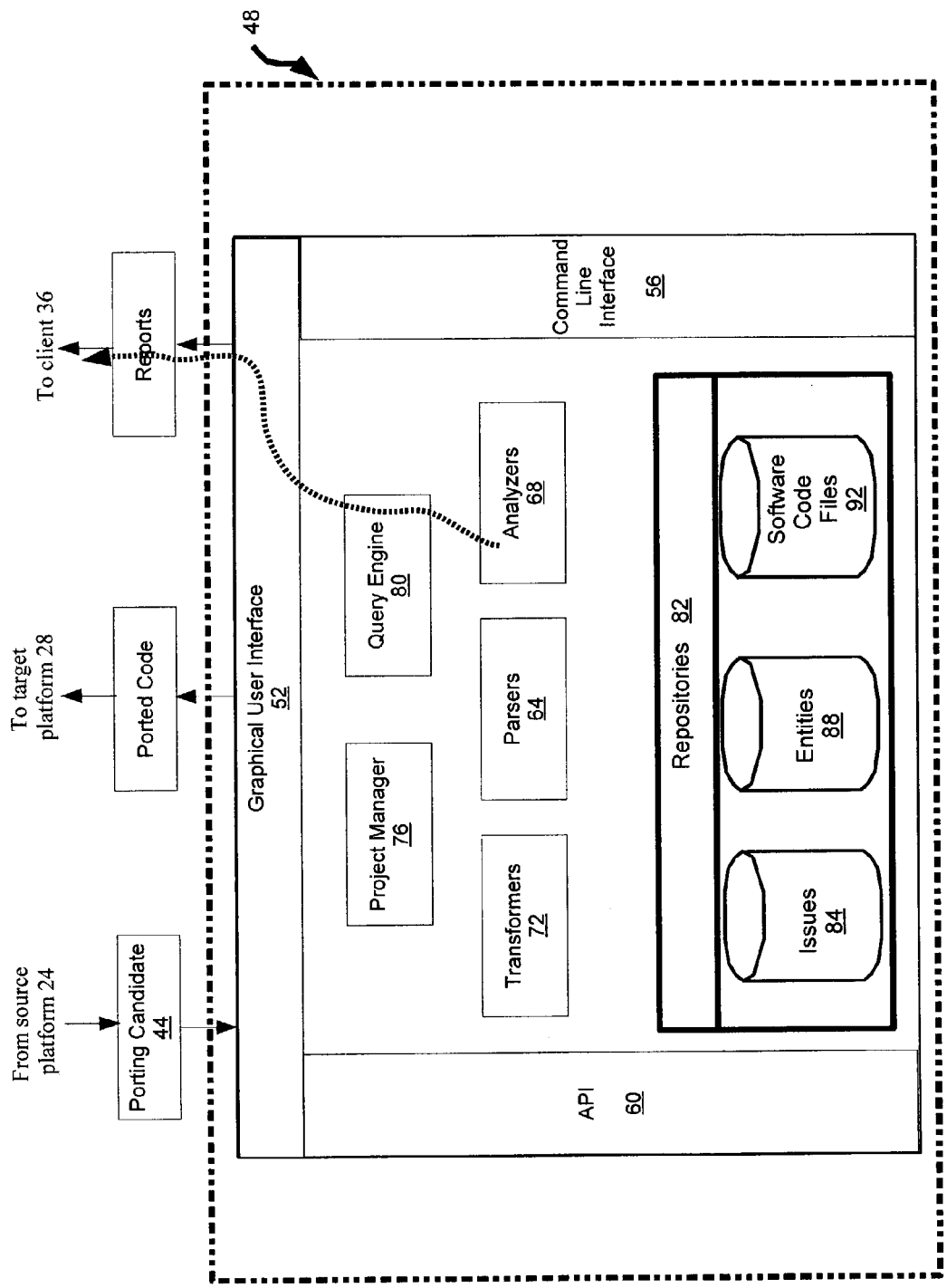
FIG. 8 is a representation of the flow of data in step 250 of FIG. 4.

The method then advances to step 250, at which point a report of issues that have been detected at step 240 is generated. When step 250 is implemented on system 20, analyzer 68 accesses the results of the analysis and generates a report therefrom. In a present embodiment, the generated report is then outputted from tool 48 to user 22 at client 36. (It is contemplated however, that in other embodiments such a report can also exist internally to tool 48, (i.e. being passed along to transformer 72) for the purpose of performing automatic modifications to code 44 in order to effect migration thereof onto target platform 28). Specialized reports can be created using the results of step 240 in conduction with specific queries given to query engine 80. For example, the effort estimation report, discussed above, can be generated and reported at this step. Such queries can also include any number of levels of complexity and criteria to allow user 22 to analyze code 44 and thereby assist in the migration of code 44 to target platform 28. A representation of the flow of data in step 260 is shown in FIG. 8, with a dotted line showing data being passed from analyzer 68 to query engine 80 and to client 36.

The method then advances to step 260, at which point code 44 is modified based on the report of detected issues generated at step 250. Such modification can occur manually and/or automatically. When modification occurs manually, the report (or a portion thereof) of issues generated at step 250 is outputted to client 36 so that user 22 can review the report to effect manual changes to code 44 in order to perform the migration of code 44 from source platform 34 onto target platform 28. However, where the modification occurs automatically, the report (or a portion thereof) of issues generated at step 250 is used by transformer 72 to effect certain automatic changes to code 44 in order to perform the migration of code 44 from source platform 24 onto target platform 28. As previously discussed, it is contemplated that issues of higher weight (i.e. greater significance, greater complexity and which appear infrequently) will typically be performed manually. However, those detected issues of lower weight (i.e., less significance, less complexity and which appear most frequently) will be performed automatically, as the requisite rules for such modifications can be relatively straightforward to program into transformer 72.

It is also contemplated that where parser 64 detects a portion of code that it does not recognize, and therefore cannot parse, then such a section of code will be so reported at step 250 and outputted to user 22 so that manual analysis and change of such a section of code can be effected.

Figure 9:
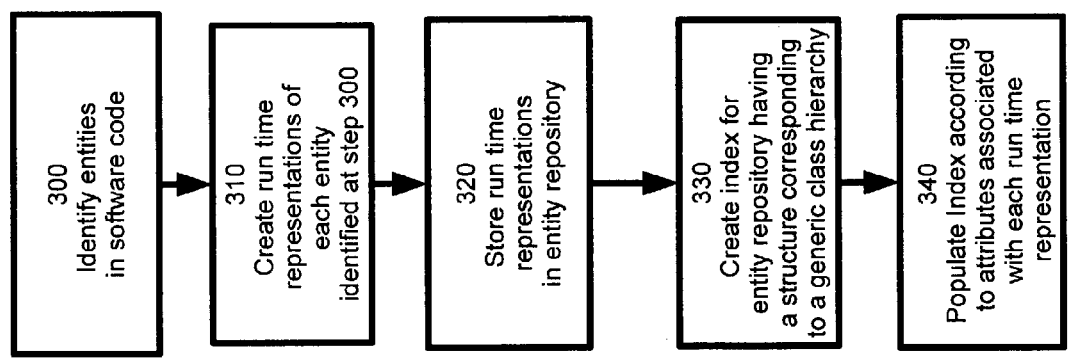
FIG. 9 is a flow-chart showing a method of generating an entity repository.

In another embodiment of the invention, there is provided a method for generating an entity repository as shown in FIG. 9. The method can be used, for example, to generate an entity repository such as repository 88 in FIG. 2. The method is one means of performing at least a portion of step 230 in the method of FIG. 4, however, other means of performing step 230 are within the scope of the invention.

Figure 10:
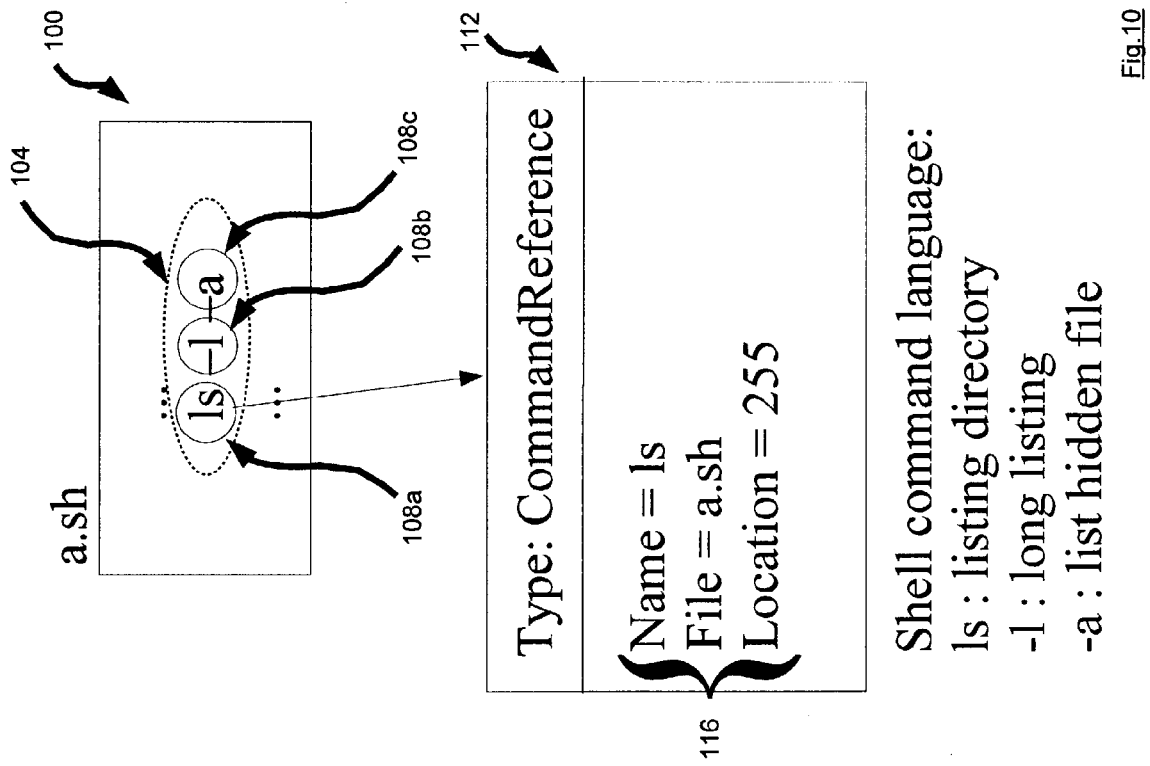
FIG. 10 shows a representation of entity generation from the method in FIG. 9.

Beginning first at step 300, entities in at least a segment of software code are identified. When used in conjunction with step 230, the received code will typically be code 44. However, an example of how step 300 can be performed is shown in FIG. 10, which shows a segment of software code 100, (which may or may not be same as code 44, or may be a portion thereof, as desired) which is identified as "a.sh". In this example, code 100 is a "shell script" named "a.sh". Shell script includes the command "1 s-1-a", identified by reference 104. At step 300, the three entities 108a, 108b and 108c which collectively compose command 104 are identified. (Note that, in this example, the Class of the entities also happens to be one of the classes shown in FIG. 3.) While not shown in FIG. 10, all the remaining entities therein are also identified in code 100.

Next, at step 310, a run time in memory representation of each entity that was identified at step 300 is created. This step is represented by a run time in memory representation 112 in FIG. 10. Run time representation 112 is a run time representation of entity 108a. Run time representation 112 includes any desired structure according to the desires of those skill in the art. In a present embodiment, run time in memory representation 112 is an object which is an instance of one of the classes shown in FIG. 3, and includes a set of attributes 116. While the example in FIG. 10 shows only run time representation 112, it is to be understood that run time representations are created for all entities identified at step 300.

At step 320, run time representations generated at step 310 are stored in the entity repository being generated according to the present method. Such storage can be effected in any way desired as known in the art. Entity repository 88 in FIG. 2 can be one format for the entity repository of step 320. At step 330, an index is created for the entity repository. The index has a structure that corresponds to a generic class hierarchy. The generic class hierarchy can be of the form hierarchy 92 in FIG. 3. This index is then operably associated in software with the entity repository, such as repository 88.

At step 340, the index that is created at step 330 is populated using the attributes associated with each run time representation stored at step 320.

The now-created entity repository can now be queried in a novel manner, by using a non-leaf node of the class hierarchy as at least one of the criteria in which is to query the entity repository, and thereby provide a novel and efficient means to query the entity repository. Such querying capability can be incorporated into, for example, query engine 80. An example of such non-leaf node of the class hierarchy is the "Definition" node 100 in FIG. 3. Those of skill in the art will recognize that queries using the leaf nodes of the class hierarchy can also be implemented.

While only specific combinations of the various features and components of the present invention have been discussed herein, it will be apparent to those of skill in the art that desired subsets of the disclosed features and components and/or alternative combinations of these features and components can be utilized, as desired. For example, in other embodiments of the invention, it is contemplated that the tool 48 can be modified to generate reports based on different potential target platforms to which migration could occur from the source platform. A list of issues can then be generated for each of the potential target platforms, and a comparison can be made between the difficulty that can be associated with migration to each of the different target platforms.

Also, while the method shown in FIG. 4 contemplates the creation of an entity repository 88 according to a class heirarchy that is specific to a known set of issues that can arise during a migration between a given source platform 24 and a given target platform 28, it is to be understood that in other embodiments of the invention, the creation of entity repository 88 could be done according to a heirarchy that is only respective to the given source platform 24, and would thereby create an entity repository 88 with a complete set of parsed information about source code 44 that could be queried using query engine 80, and irrespective of any migration issues. In this manner, user 22 can utilize tool 48 for more general reverse-engineering purposes, to perform an indepth review of the entire structure of code 44, and/or to give user 22 greater understanding of code 44.

Furthermore, it is to be understood that the source platform 24 need not actually be physically connected to target platform 28, either directly or through network 40. In a particular variation, the source files of software application 44 of the source platform 24 can simply be copied onto target platform 28 using a magnetic or other storage media. Other means of making software application 44 otherwise accessible, from the computing device where migration tool 48 is executed, can be used, as desired.

Additionally, it is also to be understood that while the embodiments herein refer to source platforms and target platforms as being based on different hardware and/or operating systems and/or programming languages, it is to be understood that a source platform and target platform could include a migration from a 32bit environment to a 64 bit environment on otherwise identical platforms. By the same token, such a migration could be directed to non-threaded to multi-threaded migrations on otherwise identical platforms. Other source and target platform examples will now be understood by those of skill in the art.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method for supporting migration of software code from a source platform to a target platform comprising the steps of:
   scanning the software code and building a repository of the software code;
   parsing the software code and generating a repository of program entities in accordance with known types of entities;
   loading a list of potential issues from a database of known issues, wherein said database of known issues includes known issues from a plurality of different source platforms and the loaded list of potential issues comprises a subset of the known issues in the database pertaining to migration of software code from the source platform to the target platform;
   detecting the occurrences of issues in the software code including mapping at least some of the program entities to the list of potential issues; and,
   generating a report including at least a list of the detected issues.

2. The method according to claim 1 further comprising the step of correcting the detected issues.

3. The method according to claim 2 wherein said correcting step is performed by manually coding corrections based on information from said report.

4. The method according to claim 1 comprising the additional step of detecting missing files in said software code.

5. The method according to claim 4 wherein said report includes a list of at least some of said detected missing files.

6. The method according to claim 1 wherein said report includes an estimate of the amount of effort to manually correct said detected issues.

7. The method according to claim 1 wherein said report further includes a suggestion as to how said software code can be modified in order to effect said migration.

8. A system for supporting migration of a software code from a source platform to a target platform comprising:
   means for scanning the software code and building a repository of the software code;
   means for classifying the software code using predefined file types;
   means for parsing the software code using robust parsers and generating a repository of program entities;
   means for dynamically loading a list of potential issues for migrating code from said source platform to the target platform from a database of known issues;
   means for detecting the occurrences of issues in the software code based on the program entities; and,
   means for generating a report including at least a list of the detected issues.

9. The system according to claim 8 wherein said list of known issues includes known issues from a plurality of different source platforms and said means for scanning includes a determination of which particular source platform said software code originates from.

10. The system according to claim 8 further comprising means for receiving queries usable by said means for generating a report in order to customize said report according to said query.

11. A tool for supporting migration of software from a source platform to a target platform comprising:
    an interface for receiving candidate code and user input;
    a project manager connected to said interface for scanning and classifying said candidate code to generate information on said candidate code;
    a first repository connected to said project manager for storing said information;
    a parser connected to said first repository for parsing said candidate code to generate program entities about said candidate code;
    a second repository connected to said parser for storing said program entities;
    a third repository for storing known issues about migration from said source platform to said target platform;
    an analyzer connected to said second repository and said third repository for comparing said program entities with said known issues from which a report of detected issues can be generated; and
    an interface for outputting said report of detected issues.

12. The tool according to claim 11 including at least one additional parser associated with at least one additional source platform.

13. The tool according to claim 11 further comprising a transformer for modifying at least a portion of said candidate code into a form suitable for the said target platform based on a detected issue from said report and based on a known correction for the detected issue.

14. The tool according to claim 11 wherein said report further includes an estimate of a length of time to manually correct said detected issues.

15. The tool according to claim 11 wherein the report of detected issues is output to an external editor for use in modifying the candidate code.

16. The tool according to claim 11 wherein said report further comprises recommended corrections to address one or more of the detected issues.

* * * * *